United States Patent Office 3,631,097
Patented Dec. 28, 1971

3,631,097
OXIDATION OF ALKYLATED DIPHENYL COMPOUNDS
Ludwig J. Christmann, Bronxville, N.Y.; Louise Christmann, executrix of said Ludwig J. Christmann, deceased, and Edward Sherrill Roberts, Ridgewood, N.Y.; said Roberts assignor to Carbogen Corporation, Bronxville, and Wilmot & Cassidy, Inc., Brooklyn, N.Y.
No Drawing. Continuation of application Ser. No. 461,497, June 4, 1965, which is a continuation-in-part of application Ser. No. 176,101, Feb. 27, 1962. This application June 19, 1968, Ser. No. 750,670
The portion of the term of the patent subsequent to Oct. 8, 1985, has been disclaimed
Int. Cl. C07c 63/02
U.S. Cl. 260—520     8 Claims

ABSTRACT OF THE DISCLOSURE

Alkylated diphenyl reactants are oxidized to diphenylcarboxylic acids, using gaseous $NO_2$ as oxidant and a solvent substantially inert to $NO_2$ at elevated temperature. The reactants are alkylated diphenyls or alkylated diphenylethers which may contain substituents which do not interfere with the oxidation. The oxidation temperature is at least 125° C. Selenium may be added to the reaction mixture.

---

This application is a continuation of co-pending application Ser. No. 461,497 filed June 4, 1965 (now abandoned), which in turn is a continuation-in-part of earlier co-pending application Ser. No. 176,101 filed Feb. 27, 1962 (now abandoned).

This invention relates to the production of oxidation products from alkylated diphenyl compounds, and more particularly to the formation of mono- and poly-carboxylic acids therefrom.

In one embodiment, the invention involves oxidation of dialkylidiphenyls to convert one or both of the alkyl groups therein to carboxyl groups. In another embodiment, the invention involves oxidation of the dialkyldiphenyl ethers to convert one or both of the alkyl groups therein to carboxyl groups.

The process according to the invention is advantageous over prior art methods in that it provides a regenerable oxidizing agent which is capable of producing the desired oxidation in good yields at relatively low pressures, thus avoiding disadvantages of the prior art processes.

In the process of the invention, alkylated diphenyls or alkylated diphenylethers are oxidized to produce the corresponding carboxylic acids. The starting materials may have substituent groups, e.g. halogen or nitro, which do not interfere with the oxidation. Examples of suitable starting materials include 4,4'-ditolyl; 4,4'-ditolylether; and chloro and nitro derivatives and position isomers of such compounds. The starting material may contain one or more alkyl groups in the molecule, and the alkyl groups typically have one to six carbon atoms per group. One or more of the alkyl groups is oxidized by the process of the invention to produce a carboxyl group or groups. Examples of such oxidations are: 4,4'-ditolyl to 4,4'-dicarboxydiphenyl and 4,4'-ditolylether to 4,4'-dicarboxydiphenylether.

The process of the invention involves dissolving the starting material in a solvent substantially inert to $NO_2$ at elevated temperatures, and passing gaseous $NO_2$ into the solution at a temperature of at least 125° C. to oxidize the starting material to a corresponding carboxylic acid.

Suitable solvents for use according to the invention include various chlorinated benzenes. Preferably, those having 2 to 4 chlorine atoms are used, although higher or lower chlorinated benzenes may be used. Also usable under certain conditions are such solvents as nitrobenzenes, diphenyl ether, chlorinated diphenyls, and others which are sufficiently inert and having boiling points above the temperatures involved in the reaction.

A considerable range of temperatures may be used in the reaction. The minimum temperature for commercial operation is about 125°–140° C. and preferably it ranges from about 165° C. to 200° C., although higher temperatures up to the decomposition points of reactants and products of reaction may be used. The temperatures are above those at which $N_2O_4$ is largely dissociated into $NO_2$ as the latter is the effective oxidizer. In the reaction the $NO_2$ is substantially completely reduced to NO making the recovery thereof and reconversion to $NO_2$ a simple and complete operation, so that it is re-cycled with practically no loss. This is an important aspect of the invention from the commercial and economic aspect.

Generally, the operation of the present process is exemplified by the oxidation of 4,4'-ditolylether to produce 4,4'-dicarboxydiphenyl or its intermediate 4-tolyl-4'-carboxyphenylether. The ditolylether may be dissolved in trichlorobenzene to provide a 5% to 20% solution. The solution is heated to about 180–200° C. at atmospheric pressure and $NO_2$ gas bubbled through the solution. As the oxidation proceeds, the exothermic heat developed is removed by cooling so as to maintain the desired temperature. The $NO_2$ is reduced practically completely and the exiting NO gas lacks the reddish brown color of $NO_2$. The operation is continued until the conversion to desired product is complete. Since it is insoluble in the medium it may be removed from the slurry, washed and dried. The reaction may be carried out in successive temperature stages, with higher temperature in the later stages, as for example using temperatures of 160–180° C. in the early stages and 190–200° C. in the later stages.

Because of the physical condition of the slurry, the separation of product may be conducted hot in a centrifuge equipped with a stainless steel screen. The filtrate contains unreacted material and is returned to the reaction. Usually the $NO_2$ is introduced in a steady stream, and at the temperature of the reaction vaporization of reactant and trichlorobenzene takes place, and water vapor is formed; they are condensed and reactant and trichlorobenzene are returned to the reaction, usually continuously. Fresh reactant may be introduced at the rate at which it is oxidized and the $NO_2$ at the rate at which it is reduced. This makes possible a continuous operation.

The efficiency of consumption of $NO_2$ sets the production rate of product and the rate of removal of the slurry determines the slurry density in the reactor. It is desirable to keep this density low and the rate of removal of the slurry is gaged by this factor, whereby the operation can become practically automatic.

In a preferred embodiment, the process of the invention involves the addition of selenium to the reaction mixture, preferably in amount from 0.5 to 5.0 wt. percent of the dialkyldiphenyl reactant. Such addition promotes the reaction of $NO_2$ and the conversion of reactant to carboxylic acid. The selenium may be oxidized by the $NO_2$ to form $SeO_2$ which then reacts with the dialkyldiphenyl compound, but the invention is not limited by any theory. In some cases, satisfactory oxidation is not obtained with $NO_2$ in the absence of selenium, whereas addition of selenium results in satisfactory oxidation.

The process of the invention can be carried out at atmospheric or elevated pressure, e.g. up to 100 p.s.i.g. or higher. An advantage of the process is that it can be carried out at atmospheric pressure with quite satisfactory results.

Because of the high efficiency of the reduction of the NO$_2$ it becomes feasible to reconvert it by a simple and economical step. The effluent gases which are free from oxygen are cooled to condense the water vapor therefrom; then the gases may be further dried by passing through silica gel. Since NO which is free from NO$_2$ is insoluble in water and there is no oxygen present, there is no loss of NO in this step. The stream of water-free gas containing NO is mixed with dry air or oxygen and passed through a bed of silica gel which is cooled to absorb the heat of oxidation generated, and the NO$_2$ is absorbed onto the silica gel. Thereafter the silica gel is heated to drive off the NO$_2$, which is returned to the cycle. The NO$_2$ may be condensed for storage or it may be fed directly into the reactor, thus completing the cycle.

The apparatus used in the following examples is essentially a 3-liter resin flask equipped with a stirrer and having baffles along the sides thereof. An inlet for NO$_2$ reaches near the bottom of the flask and another similar inlet is provided for a solution of the alkylbenzene. An overflow near the top provides for the removal of the oxidized mixture. A reflux condenser at the top of the flask returns condensed vapors (other than water) to the flask for reuse in the reaction.

The following are specific examples of the operation of the invention without limiting the scope thereof.

EXAMPLES 1300 cc. of trichlorobenzene are placed in a 3-liter resin flask. 200 grams of 4,4'-dimethyldiphenylether are dissolved in 500 cc. of trichlorobenzene at room temperature to produce a reactant solution. The flask is heated to 185° C., and addition of reactant solution to the flask is begun. NO$_2$ gas is bubbled through the flask. The temperature in the flask is held at 190 to 197° C. The off gases are red colored indicating the presence of unreacted NO$_2$. After half an hour, 2 grams of selenium are added to the reaction mixture, and the remainder of the reactant solution is added over a three-hour period. The off gases are pale tan in color during this period indicating conversion of NO$_2$ to NO in the flask. The oxidation is continued for another ¾ hour.

The contents of the flask are cooled, and the solids are filtered and washed with methanol. The solids are dried to obtain 165 grams of product having neutralization number of 128.

When using 4,4'-ditolyl in place of 4,4'-dimethyldiphenylether, similar results are obtained, the solid product containing 4-tolyl-4'-carboxyphenyl and 4,4'-dicarboxydiphenyl rather than 4-tolyl-4'-carboxyphenyl ether and 4,4'-di(carboxyphenyl)ether.

We claim:

1. Process for oxidizing an alkylated diphenyl reactant which comprises dissolving said alkylated diphenyl reactant in a solvent substantially inert to NO$_2$ at elevated temperatures, and passing gaseous NO$_2$ into the solution at a temperature of at least 125° C. in the presence of selenium to oxidize said reactant to a corresponding diphenylcarboxylic acid, said reactant being alkylated diphenyl or alkylated diphenylether and containing no additional substituent groups or substituent groups which do not interfere with the oxidation.

2. Process according to claim 1 wherein said solvent is selected from the group consisting of chlorinated benzenes, nitrobenzenes, diphenylether and chlorinated diphenyls.

3. Process according to claim 1 wherein said temperature is at least 160° C. and is below the decomposition points of reactants and reaction products.

4. Process according to claim 1 wherein substantially all of said NO$_2$ is reduced and the exit gases containing NO are substantially free of NO$_2$, the exit gases are cooled to condense water, the water is separated from the gases, the gases are contacted with oxygen to convert NO to NO$_2$, and the NO$_2$ is recycled to the oxidation.

5. Process according to claim 1 wherein 4,4'-ditolyl is oxidized by said NO$_2$ to 4,4'-dicarboxydiphenyl.

6. Process according to claim 1 wherein 4,4'-ditolylether is oxidized by said NO$_2$ to 4,4'-dicarboxydiphenylether.

7. Process for oxidizing an alkylated diphenyl reactant which comprises dissolving said alkylated diphenyl reactant in a solvent selected from the group consisting of chlorinated benzenes, nitrobenzenes, diphenylether and chlorinated diphenyl, and passing gaseous NO$_2$ into the solution at a temperature of at least 160° C. in the presence of selenium to oxidize said reactant to a corresponding diphenylcarboxylic acid, said reactant being alkylated diphenyl or alkylated diphenylether.

8. Process according to claim 3 wherein the temperature is within the range of from 165 to 200° C.

References Cited

UNITED STATES PATENTS 3,405,171   10/1968   Roberts et al. _____ 260—524 N

OTHER REFERENCES

Remy, "Treatise on Inorganic Chemistry," vol. I, Elsevier, New York, 1956, pp. 746–47.

LORRAINE A. WEINBERGER, Primary Examiner

R. S. WEISSBERG, Assistant Examiner

U.S. Cl. X.R.

260—524 N